Patented Feb. 26, 1952

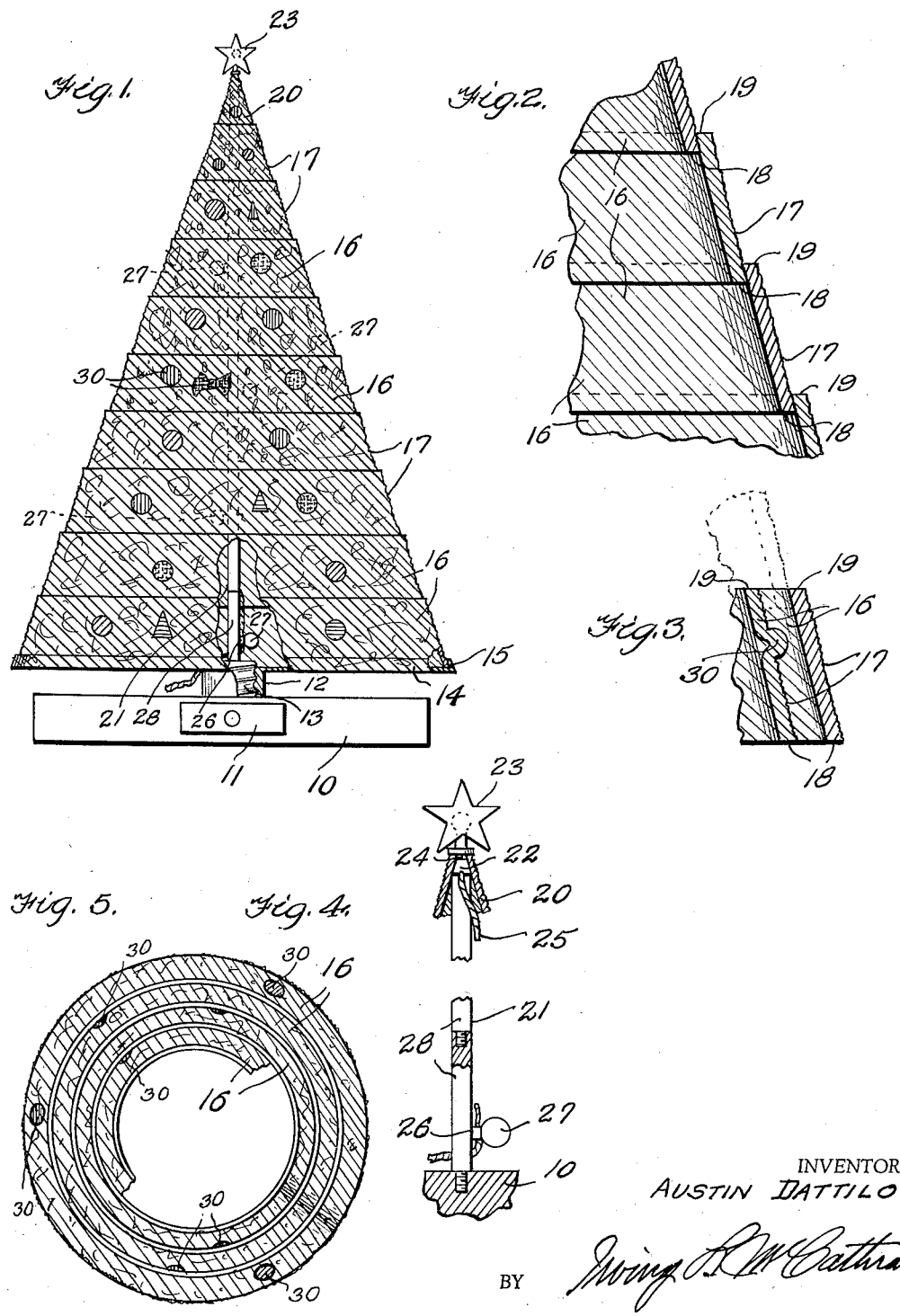

2,586,791

UNITED STATES PATENT OFFICE 2,586,791

ARTIFICIAL CHRISTMAS TREE

Austin Dattilo, Hammonton, N. J.

Application March 16, 1950, Serial No. 149,941

4 Claims. (Cl. 41—15)

This invention relates to an artificial or synthetic Christmas tree, and has for one of its objects the production of a simple and efficient tree which will provide an illuminated and attractive Christmas tree having the ornaments thereof forming an integral part of the tree, the tree and ornaments being formed of transparent or translucent material, and the tree being illuminated by an interior lighting means.

A further object of this invention is the production of a simple and efficient artificial Christmas tree which is formed of a plurality of interfitting sections which, when extended, will simulate a Christmas tree, the sections also being slidable one within the other when collapsed to be accommodated in a minimum amount of space for storage and shipment.

Other objects of this invention will appear throughout the following specification and claims.

In the drawing:

Figure 1 is a side elevational view of the Christmas tree in an extended position, certain portions being shown in section;

Figure 2 is an enlarged fragmentary vertical sectional view of a series of sections when in an operative position and in extended relation;

Figure 3 is a fragmentary sectional view illustrating the manner in which the sections fit one within the other when in an inoperative or nested relation for storage purposes;

Figure 4 is an enlarged fragmentary vertical sectional view illustrating the sectional supporting standard and a portion of the upper or cap section and top ornament;

Figure 5 is a fragmentary top plan view of a series of tree sections in a collapsed position.

By referring to the drawing in detail, it will be seen that 10 designates a base. A suitable drawer 11 is provided in the base, within which drawer bulbs and other detachable elements may be stored. An upstanding externally threaded post 12 is carried by the base 10, and a trunk section 13 of the tree is threaded upon the post 12 when the sections of the tree are assembled. A tree base plate 14 is carried by the trunk section 13, and this plate 14 is provided with an inwardly and upwardly inclined annular flange 15, as shown in Figure 1. This flange 15 constitutes a means for preventing lateral displacement of the bottom tree section when the sections are in an extended position.

A plurality of annular tapering sections 16 are mounted in interfitting relation, one within the other, as shown in Figures 1 and 2, when in an operative position to define a Christmas tree. The side wall 17 of each section 16 is upwardly and inwardly inclined, as shown in detail in Figures 2 and 3, and the diameters of the respective sections 16 are progressively reduced from the base to the apex of the tree. Each annular section 16, therefore, tapers upwardly from its base or bottom edge 18 to its top edge 19. Since the diameter of the upper edge 19 of one section 16 is smaller than the diameter of the lower edge 18 thereof, the upper edge of the lower section will fit snugly around the bottom of the section just above, and the upward movement of the sections will be limited when the tree is in a set-up position.

A cap section 20 is placed at the top of the tree and its lower edge fits snugly within the upper end of the uppermost annular section 16, as shown in Figure 1, thereby defining an apex for the cone-like tree. A centrally located supporting rod 21 is threaded into or otherwise secured to the post 12, at its lower edge, and extends vertically throughout the center of the tree. The upper end 22 is tapered to fit snugly within the apex of the cap section 20, as shown in Figure 4, and rigidly supports the cap section 20. An illuminated ornament 23 is threaded into a socket 24 at the top of the supporting rod 21 to hold the cap section 20 in place, and an electrical current supply line 25 extends to the socket 24 to supply current thereto. Other sockets 26 and bulbs 27 are located at selected intervals upon the rod 21 and are connected to the line 25 in the conventional manner. The rod 21 preferably consists of several detachable sections 28 having threaded connection joints such as the joint 29 shown in Figure 4. The cap section 20 preferably is formed in the shape of a cone.

The sections 16 and 20 all are formed of transparent or translucent plastic, unbreakable glass, or similar material. The tree preferably is colored green, and the ornaments 30 which may be of any desired number, are formed integral with the sections 16 of the tree and are of suitable design and color. The ornaments are suitably located to provide a desired decorative effect, and preferably are red, blue, yellow, or any desired, color, and all are transparent.

It should be understood that when the sections 16 and 20 are assembled in extended relation, the assembled sections simulate a Christmas tree which is interiorly illuminated. Since the sections of the tree and the ornaments thereof are colored and transparent, a very pleasing and decorative effect is obtained. It will be noted that the sections are arranged in horizontal positions in interfitting relation one within the other when in an operative or extended position. The sections tightly fit together and in combination with the central rod 21 which constitutes a central bracing stem, a rigid structure is provided, whereby all of the sectional parts are held in rigid assembled extended relation. The sections 16 may be either smooth or of a roughened exterior contour to simulate the appearance of an evergreen tree, without departing from the spirit of the invention. The roughened exterior contour, as shown in Figure 3, will facilitate frictional grip between the sections.

It should be understood that the ornament 23 may be removed and the sections 20 and 16 may then be lifted out of engagement with the rod 21. The sections may then collapse one within the other from an extended position shown in detail in Figure 2, to the collapsed position shown in Figure 3, where one section falls downwardly into the next lower section. When in a totally collapsed position, all of the sections 16 and the cap section 20 will fit within the bottom section 16. When the sections of the tree are in an extended position, the rod 21 will support the top or cap section 20, and the other sections 16 will be progressively suspended from the lower edge of the section just above. The bottom edge of the bottom section will also rest upon the base plate 17. The parts are preferably arranged so that the sections will tightly fit when in an extended position and the sectional rod 21 is of a proper length so as to support the sections in this tightly fitting extended relation.

It is obvious that since the ornament 23 is threaded into the socket 24 at the top of the supporting rod 21, and the base plate 14 is threaded upon the trunk section 13 of the base 10, the ornament 23 and base plate 14 may be threaded toward or away from each other to bind the parts together in rigid relation, or to release the parts for the purpose of collapsing the sections of the tree. The weight of the sections will cause the sections to hang one upon the other in suspended relation from the cap section down to the base section, thereby providing a binding or frictional grip between the sections to hold the sections in substantially rigid relation, the cap section being locked upon the upper end of the bracing rod. The base section is adjusted to just contact the lower edge of the bottom section so as to avoid breaking the frictional grip between the sections while at the same time permitting the flange 15 to hold the bottom section against lateral displacement. Merely by threading the base plate upwardly upon the threaded trunk section 13, while the ornament 23 is still in a locked position, the frictional grip between the sections may be quickly and easily released. The lower sections of the tree may then be raised to permit access to the bracing standard. The standard may be detached from the base and the ornament 23 may be detached, thereby releasing the cap section 20.

Having described the invention, what is claimed as new is:

1. An artificial Christmas tree comprising a cone-shaped cap section, a bottom tapering section and a plurality of annular tapering intermediate sections of progressively reduced diameters arranged in vertically extensible interfitting relation to each other and to the cap and bottom sections, each section having an upwardly and inwardly inclined wall, a base, a central bracing rod supported by said base and having an upper end fitting snugly within the cap section, locking means engaging the upper end of the bracing rod and cap section for locking the cap section upon the bracing rod, a base plate vertically adjustable upon said base and supporting said bottom section and having means for holding said bottom section against lateral displacement, the base plate and locking means being selectively adjustable toward and away from the base to insure a binding tight fitting action between the adjacent extensible interfitting sections in a manner whereby the sections will hang upon and are suspended from each other, the cap section being locked upon the bracing rod, the weight of the sections binding the sections together through a frictional grip by the pull of gravity, the bottom section contacting the base plate and being held against lateral displacement thereon to hold all of the parts of the entire assembly in rigid relation with respect to the base, and the vertical adjustment of the base plate being adapted to release the frictional grip between the sections to facilitate the collapsing of the extensible sections.

2. An artificial Christmas tree comprising a cone-shaped cap section, a bottom tapering section and a plurality of annular tapering intermediate sections of progressively reduced diameters arranged in vertically extensible interfitting relation to each other and to the cap and bottom sections, each section having an upwardly and inwardly inclined wall, a base, a central bracing rod supported by said base and having an upper end fitting snugly within the cap section, locking means engaging the upper end of the bracing rod and cap section for locking the cap section upon the bracing rod, a base plate vertically adjustable upon said base and supporting said bottom section and having means for holding said bottom section against lateral displacement, the base plate and locking means being selectively adjustable toward and away from the base to insure a binding tight fitting action between the adjacent extensible interfitting sections in a manner whereby the sections will hang upon and are suspended from each other, the cap section being locked upon the bracing rod, the weight of the sections binding the sections together through a frictional grip by the pull of gravity, the bottom section contacting the base plate and being held against lateral displacement thereon to hold all of the parts of the entire assembly in rigid relation with respect to the base, the vertical adjustment of the base plate being adapted to release the frictional grip between the sections to facilitate the collapsing of the extensible sections, said sections being formed of transparent material, and illuminating means mounted within said sections.

3. An artificial Christmas tree comprising a cone-shaped cap section, a bottom tapering section and a plurality of annular tapering intermediate sections of progressively reduced diameters arranged in vertically extensible interfitting relation to each other and to the cap and bottom sections, each section having an upwardly and inwardly inclined wall, a base, a central bracing rod supported by said base and having an upper end fitting snugly within the cap section, locking means engaging the upper end of the bracing rod and cap section for locking the cap section upon the bracing rod, a base plate vertically adjustable upon said base and supporting said bottom section and having means for holding said bottom section against lateral displacement, the base plate and locking means being selectively adjustable toward and away from the base to insure a binding tight fitting action between the adjacent extensible interfitting sections in a manner whereby the sections will hang upon and are suspended from each other, the cap section being locked upon the bracing rod, the weight of the sections binding the sections together through a frictional grip by the pull of gravity, the bottom section contacting the base plate and being held against lateral displacement thereon to hold all of the parts of the entire assembly in rigid relation with respect to the base, the vertical adjustment of the base plate being adapted to release the frictional grip between the sections to facilitate the collapsing of the extensible sections, and said sections having a roughened outer face to simulate the appearance of an evergreen tree and also to facilitate frictional gripping of the sections together when in an extended position.

4. An artificial Christmas tree comprising a cone-shaped cap section, a bottom tapering section and a plurality of annular tapering intermediate sections of progressively reduced diameters arranged in vertically extensible interfitting relation to each other and to the cap and bottom sections, each section having an upwardly and inwardly inclined wall, a base, a central bracing rod supported by said base and having a tapering upper end fitting snugly within the cap section, locking means threaded upon the upper end of the bracing rod and cap section for locking the cap section upon the bracing rod, a base plate threaded upon said base for vertical adjustment upon said base and supporting said bottom section and having means for holding said bottom section against lateral displacement, the base plate and locking means being selectively adjustable toward and away from the base to insure a binding tight fitting action between the adjacent extensible interfitting sections in a manner whereby the sections will hang upon and are suspended from each other, the cap section being locked upon the bracing rod, the weight of the sections binding the sections together through a frictional grip by the pull of gravity, the bottom section contacting the base plate and being held against lateral displacement thereon to hold all of the parts of the entire assembly in rigid relation with respect to the base, and the vertical adjustment of the base plate being adapted to release the frictional grip between the sections to facilitate the collapsing of the extensible sections.

AUSTIN DATTILO.

REFERENCES CITED

The following references are of record in the file of this patent:

UNITED STATES PATENTS

| Number | Name | Date |
|---|---|---|
| 2,125,906 | Frei | Aug. 9, 1938 |
| 2,171,116 | Muldoon | Aug. 29, 1939 |
| 2,186,327 | Crosser | Jan. 9, 1940 |
| 2,227,861 | Petrone | Jan. 7, 1941 |
| 2,420,772 | Dalton | May 20, 1947 |

FOREIGN PATENTS

| Number | Country | Date |
|---|---|---|
| 726,518 | France | May 3, 1932 |

OTHER REFERENCES

Popular Mechanics, January 1937; page 117. (Copy in 41—15.)